United States Patent [19]
Mitchell

[11] 3,885,684
[45] May 27, 1975

[54] SILAGE SPREADER

[76] Inventor: Lester R. Mitchell, Rt. 1, Detroit Lakes, Minn. 56501

[22] Filed: June 27, 1974

[21] Appl. No.: 483,695

[52] U.S. Cl. ............ 214/17 CB; 198/128; 239/687; 302/60
[51] Int. Cl. ............................................ B65g 65/32
[58] Field of Search .......... 214/17 C, 17 CB; 193/3; 198/128; 239/681, 687; 302/60

[56] References Cited
UNITED STATES PATENTS

| | | | |
|---|---|---|---|
| 3,572,523 | 3/1971 | Cymara | 214/17 CB |
| 3,794,386 | 2/1974 | Hite | 302/60 |

Primary Examiner—Robert G. Sheridan
Attorney, Agent, or Firm—Robert E. Kleve

[57] ABSTRACT

The invention comprises a silage spreader. The spreader has a shaft with a plurality of fins projecting outward and downward in a cone-like manner from the shaft with the lower ends of the fins bent angularly outward. The shaft is rotatably mounted to the outlet pipe of a silage blower so that the spreader is directly beneath the silage as it travels out of the outlet pipe into a silage bin. The angled lower end of the fins upon engagement with the silage causes the fins to rotate on the axis of the shaft with the rotation of the fins causing silage engaging the fins to be thrown outward. The lower ends of the fins are spaced from one another so that some silage may pass through the space directly below the spreader.

1 Claim, 5 Drawing Figures

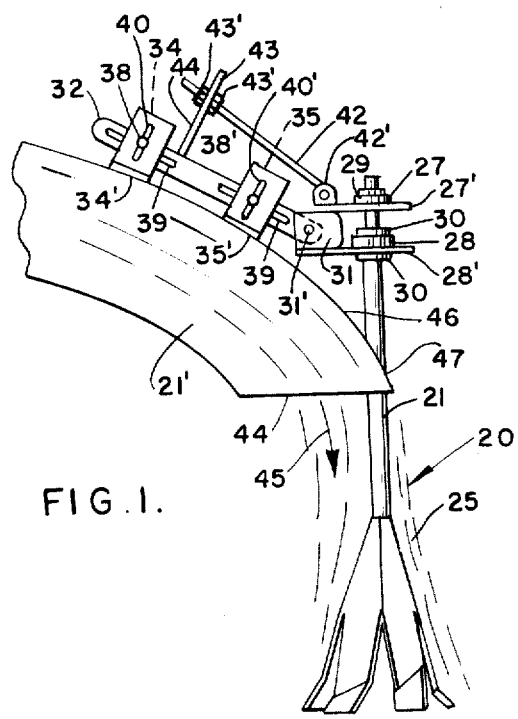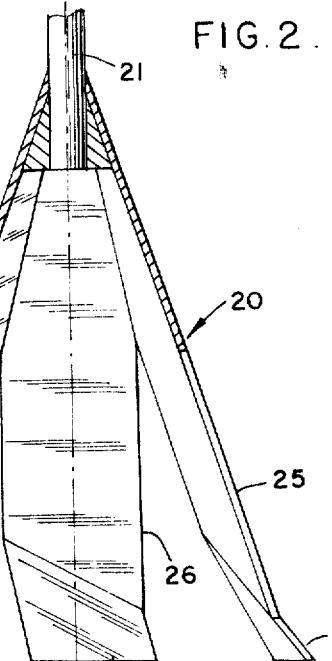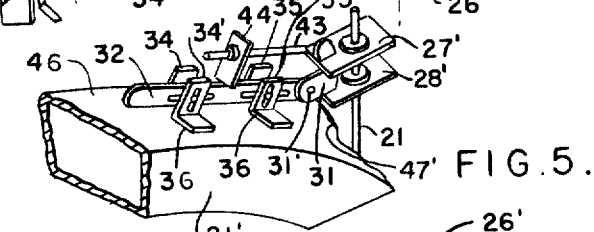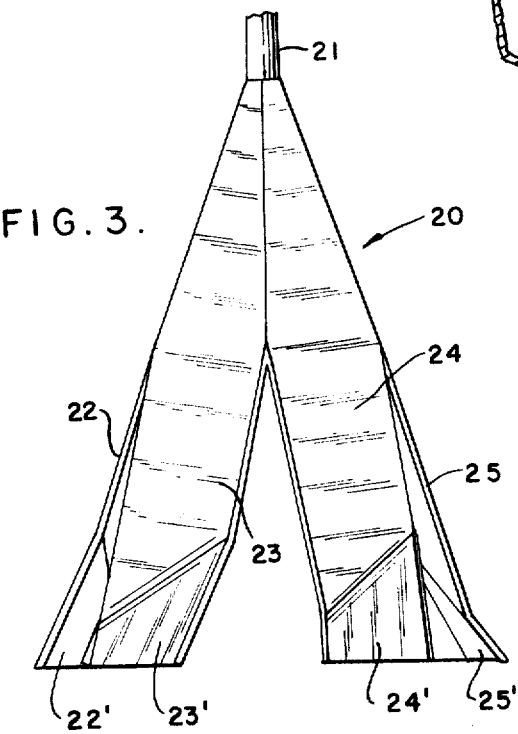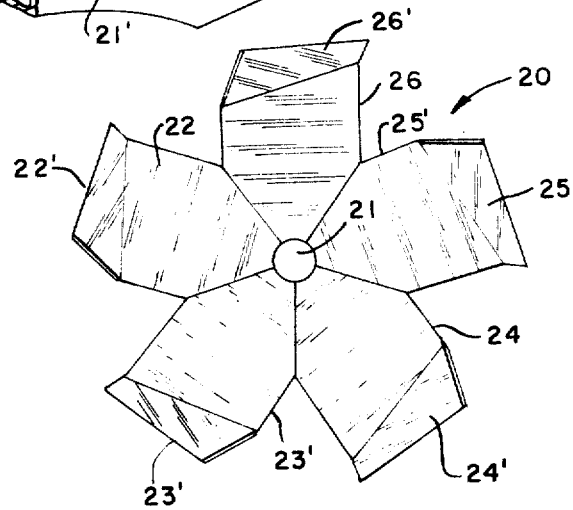

SILAGE SPREADER

This invention relates to silage spreaders or distributors.

It is an object of the invention to provide a novel silage spreader which acts to revolve in response to the engagement of the silage to the spreader to spread the silage more evenly about a bin.

It is another object of the invention to provide a novel silage spreader which acts to distribute some of the silage in the central portion of the bin and which rotates in response to the engagement of some of the silage with the outwardly-flared angled fins of the spreader so as to cause some of the silage to be tossed or spread about the outer circumference of the bin.

It is another object of the invention to provide a novel silage spreader which is propelled in a circle by the engagement of the silage with the spreader with the motor of the spreader acting to spread the silage about the outer circumferential portion of the bin.

Further objects and advantages of the invention will become apparent as the description proceeds and when taken in conjunction with the accompanying drawings wherein:

FIG. 1 is a perspective view of the silage spreader invention shown in operative position on the outlet spout of a conventional silage blower or silage lifting pipe.

FIG. 2 is a side elevational view of the silage spreader invention.

FIG. 3 is a top plan view of the silage spreader.

FIG. 4 is a cross-sectional view of the silage spreader taken along line 4—4 of FIG. 3.

FIG. 5 is a fragmentary perspective view of the attachment bracket.

Briefly stated, the invention comprises a silage spreader device having a plurality of fins extending downward and outward at uniform, outwardly diverging angles to one another in a cone-like shape, with the lower portions of the fins separated and spaced from one another and with the lowermost ends of the fins angled to one side, a shaft mounted to the upper end of the pins where the fins meet at a point at the upper end of their general cone-like shape, said shaft being rotatably mounted to the outlet spout in the central area of the outlet spout beneath the outlet spout of a silage harvesting machine so that as the silage drops out of the outlet spout considerable amounts of the silage will engage the spreader with some of the silage engaging the angled corners at the lower end of the outwardly diverging fins and the reaction will cause the spreader to rotate about the longitudinal axis of the shaft and with the rotation of the device causing the silage engaging the angled fins to be tossed in an arc outward about the circumferential portions of the bin with the slotted space between the outwardly diverging fins allowing silage to drop down into the central portion of the bin to thereby distribute the silage more evenly about the central and outer portions of the bin.

Referring more particularly to the drawings, in FIG. 1 the silage spreader invention 20 is shown mounted to the outlet spout 21' of a silage blowing machine.

The silage spreader invention 20 has a shaft 21 with five identical blades 22, 23, 24, 25, and 26 fixed at their upper ends to the shaft and diverging outward and downward at an angle at approximately 20 degrees from the longitudinal axis of the shafts. The fins also extend downward in a uniform diverging angle of approximately 20 degrees to one another along a plane perpendicular to the longitudinal axis of the shaft. The lower ends of the blades or fins 22 – 26 have their corners 22' – 26' bent outwardly slightly at an angle to provide a pitch to the blades or fins.

The shaft 21 is rotatably mounted at its upper end in slightly oversized bores in a pair of bearing collars 27 and 28. The bearing collars are mounted in plates 27' and 28'. The collars provide a bearing support for the shaft to rotate. The pair of enlarged collars and annular ridges 29 and 30 are fixed on the shaft 21 above and below the end collar 27 and 28 to prevent the shaft from moving upward or downward relative to the collar plates while enabling the shaft to rotate freely axially in the collar plates.

An upright connecting plate 31 is fixed to collar plates 27' and 28' and an arm plate 32 has one end pivotally mounted to the connecting plate 31 at pivot point 31'. The other end of the arm 32 has a pair of slots 33 and 33'. A dual pair of L-shaped metal plates 34 and 34' and 35 and 35' each having their one legs 36 fixed to the top surface of the outlet chute or spout 21 and their other legs 37 projecting upward. The other legs 37 of plates 34 and 34' being mounted in spaced parallel relation on opposite sides of the arm 32. The other legs 37 of plate 34 and 34' are also mounted in spaced parallel relation on opposite sides of the arm 32.

A pair of bolts 38 and 38' pass through vertical slots 39 in plates 33 and 33' and 34 and 34', respectively. The bolts 38 and 38' also pass through the slots 40 and 40' in the arm with nuts threaded onto the bolts on the opposite end to tighten and fix the arm 32 relative to the plates 34 and 34' and 35 and 35' and the outlet chute 21. By loosening the bolts 38 and 38' the arm 32 may be slid from left to right or visa versa relative to the plates 34 and 34' and 35 and 35' and the outlet shute, so that the shaft 21 may be adjusted relative to the outlet chute to place the spreader more centrally in the path or stream of silage as may be traveling out the outlet chute 21° or adjust the position of the spreader relative to the outlet chute. Also a lug 41 is fixed to plate 27' and projects upward. An arm 42 is pivotally mounted to lug 41 and projects rearward toward the bracket 35'. The arm 32 has a plate 43 fixed to its upward end, which extends upward. The rearward end of the arm or cylindrical rod 42 is threaded and passes freely through an oversized bore in plate 43. The rearward end of arm or rod 42 is threaded. A pair of nuts 44 are threaded onto the arm 42 on the opposite sides of plate 43 to lock the arm 42 and plate 43 relative to one another. Threading the nuts 44 in one direction or the other along rod 42, will pivot shaft 21 about pivot point 31 by arm 42 pivoting relative to plate 43, to adjust the spreader relative to the outlet spout. This provides an additional means to place the spreader more centrally in the path of silage coming out of the outlet spout.

OPERATION

The silage spreader invention 20 operates as follows:

The conventional silage blower having an outlet spout will be moved adjacent a silage bin. The outlet chute or spout 21 will be placed centrally at the top of the silage bin for unloading silage out of the outlet chute into the silage bin from the top of the bin. The spreader will be adapted to place it centrally beneath the path of the silage coming out of the outlet chute. As the silage travels out of the chute 21, the spreader 20 will be in the path or stream of silage coming out of the chute as generally illustrated in FIG. 1.

As the silage travels downward out of the chute and engages against the tapered diverging fins 22 – 26, the silage will be deflected outward radially. As the silage engages the angle corners 22' – 26', the reaction of this engagement will cause the spreader to rotate clockwise, when viewed from FIG. 3, about the axis of the shaft 21, by shaft 21 rotating in the collar-like bearings 27 and 28 relative to the outlet chute.

The rotation of the spreader and its fins about the axis of the shaft will also cause silage, thereafter engaging the fins and angled corners of the fins, to be tossed further outward in an arc about the outer circumferential portions of the interior of the cylinder silage bin, so that some of the silage as it comes out of the outlet chute is distributed about the outer portions of the interior of the bin.

Also, some of the silage, as it comes down out of the outlet chute 21 against the spreader, will pass between the fins 22 – 26 in the space 35 between the blades so that some of the silage will be distributed in the central portions of the bin.

The action also tends to redistribute the silage in different areas so that the silage is mixed better.

Thus, the silage engaging the spreader angled blades of the spreader will cause the spreader to rotate by its shaft rotating in the collar plates and continues to rotate as long as a material amount of silage is coming out of the outlet chute onto the spreader, and the tapered fins, as the spreader rotates by being engaged by some of the silage, will toss the engaged silage outward to deposit the silage to the outer circumferential portions of the bin, while the silage traveling down to the spreader travels between the blades will be deposited in the central or center portions of the bin to more evenly distribute the silage about the bin.

The silage travels through the silage blower and out the outlet opening 44 at the end 21 of the chute in the direction indicated by the arrow 45. The top wall 46 of the chute 21 has a notched out portion 47 at its lower edge, centrally of the width of the chute, so that the shaft 21 may pivot into the opening 44.

Thus it will be seen that a novel silage spreader has been provided which does not require a motor or other means of power to rotate, but will rotate or is self propelled under the action of the silage engaging the fins of the spreader. While the taper of the fins 22 – 26 is approximately 20 degrees, this may vary to a certain extent also the pitch of the bent corners may be varied as well as the position of the bend to provide the pitch.

It will be obvious that various changes and departures may be made to the invention without departing from the spirit thereof accordingly, it is not intended that the invention be limited to that specifically described in the specification or as illustrated in the drawing, but only as set forth in the appended claims wherein:

What is claimed is:

1. A silage spreader device for attachment to the outlet spout of a silage harvester to spread the silage about a silage bin as it comes out of the outlet spout, said spreader comprising a shaft adapted to be rotatably mounted to the outlet spout so that the lower end of the shaft is suspended beneath the outlet spout in the path of silage coming out of said spout, a plurality of blades coming to a point about the shaft and extending outward and downward diverging relative at a uniform angle to one another in a cone-like shape with the lower portions of the fins separated and spaced from one another, and with the lowermost ends of the fins angled to one another, so that as silage drops out of the outlet spout some of the silage will engage the angled portions of the fins and cause the spreader to rotate relative to the outlet spout and to toss the silage outward as some of the silage engages the angled fins, the rotation of the fins will act to toss the silage outward in an arc, with the spaces between the fins enabling some of the silage to drop between the fins and be deposited in the central portion of the bin.

* * * * *